United States Patent
Rushin et al.

(10) Patent No.: US 8,016,947 B2
(45) Date of Patent: Sep. 13, 2011

(54) CLEANING METHOD AND SYSTEM

(76) Inventors: William Rushin, Greenwood, IN (US); Charles Rushin, Acworth, GA (US)

(*) Notice: Subject to any disclaimer, the term of this patent is extended or adjusted under 35 U.S.C. 154(b) by 657 days.

(21) Appl. No.: 12/012,899

(22) Filed: Feb. 7, 2008

(65) Prior Publication Data
US 2009/0199871 A1 Aug. 13, 2009

(51) Int. Cl.
*B08B 7/04* (2006.01)
(52) U.S. Cl. ......... 134/18; 239/150; 239/172; 239/173; 239/175; 239/302; 239/329; 239/331; 239/332; 239/722; 239/754; 134/10; 134/21; 134/32; 134/34; 134/36; 134/42; 134/172; 134/176; 134/179; 134/180; 134/198; 15/50.1; 15/320
(58) Field of Classification Search ............... 239/150, 239/172, 173, 175, 722, 754, 302, 329, 331, 239/332; 134/10, 18, 21, 32, 34, 36, 42, 134/172, 176, 179, 180, 198; 15/50.1, 320
See application file for complete search history.

(56) References Cited

U.S. PATENT DOCUMENTS

| | | | | |
|---|---|---|---|---|
| 3,702,488 | A * | 11/1972 | Kasper | 15/50.3 |
| 4,821,959 | A * | 4/1989 | Browing | 239/121 |
| 5,195,308 | A * | 3/1993 | Grote et al. | 56/16.4 R |
| 5,224,236 | A * | 7/1993 | Sallquist | 15/321 |
| 5,377,381 | A * | 1/1995 | Wilson | 15/304 |
| 5,533,676 | A * | 7/1996 | Conley | 239/663 |
| 7,152,812 | B1 * | 12/2006 | Johnson | 239/164 |
| 7,413,132 | B1 * | 8/2008 | Bogart et al. | 239/169 |
| 2003/0047200 | A1 * | 3/2003 | Harris et al. | 134/34 |
| 2008/0197210 | A1 * | 8/2008 | Hahn et al. | 239/160 |

* cited by examiner

*Primary Examiner* — Bibi Carrillo
(74) *Attorney, Agent, or Firm* — Daniel J. O'Connor

(57) ABSTRACT

A method of cleaning a surface such as a driveway or a vertical wall which includes converting or retro-fitting a zero-turn radius (ZTR) or other type of mower to a cleaning apparatus. The conversion of the mower includes the steps of adding a water supply tank to the deck area of the mower and providing low pressure and high pressure flow lines. The low pressure flow lines are supplied via a low pressure pump. The high pressure flow lines are supplied by a separate high pressure pump unit. Plural solenoid valves are utilized in the method and system to control the flow of a cleaning solution for various method operations.

1 Claim, 5 Drawing Sheets

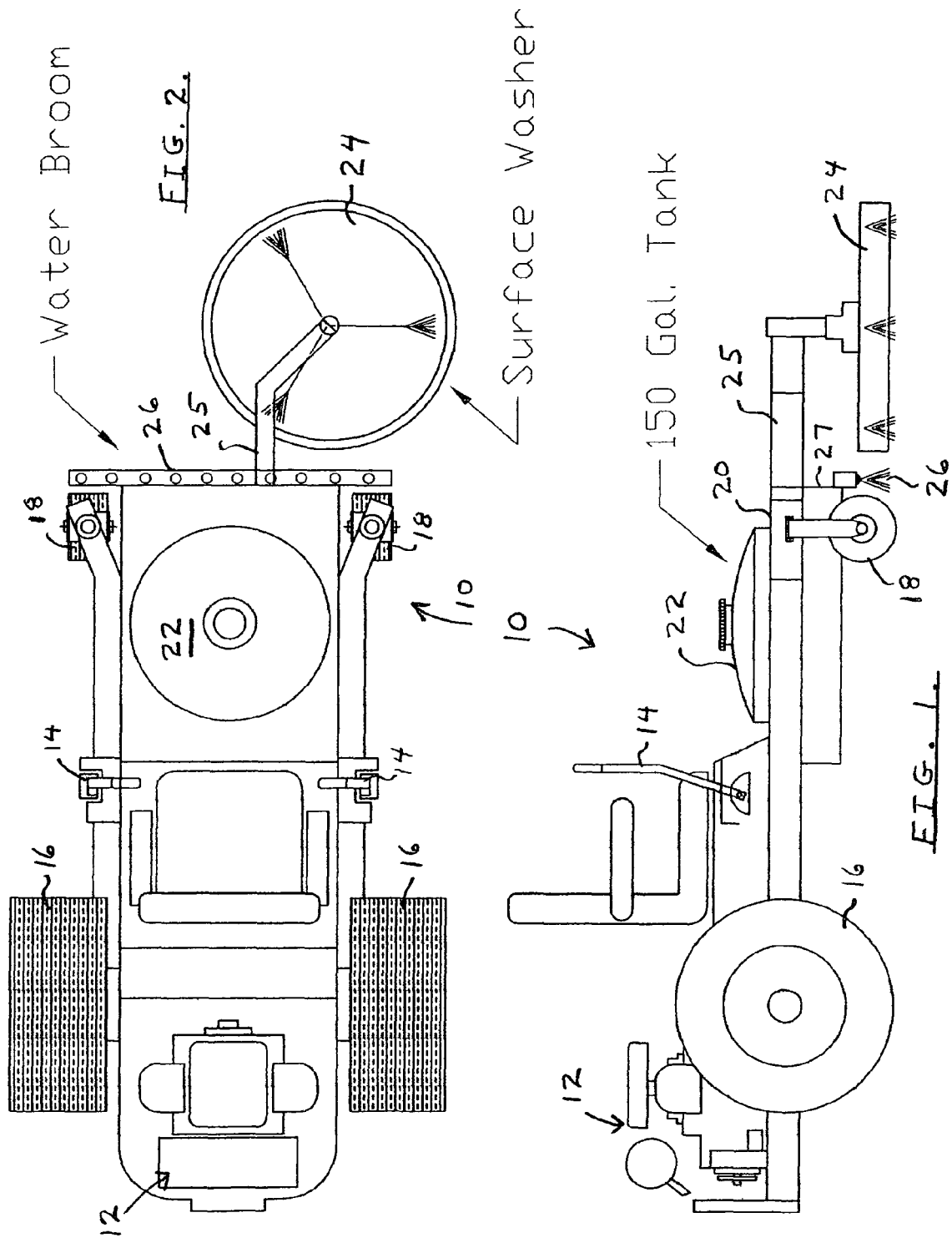

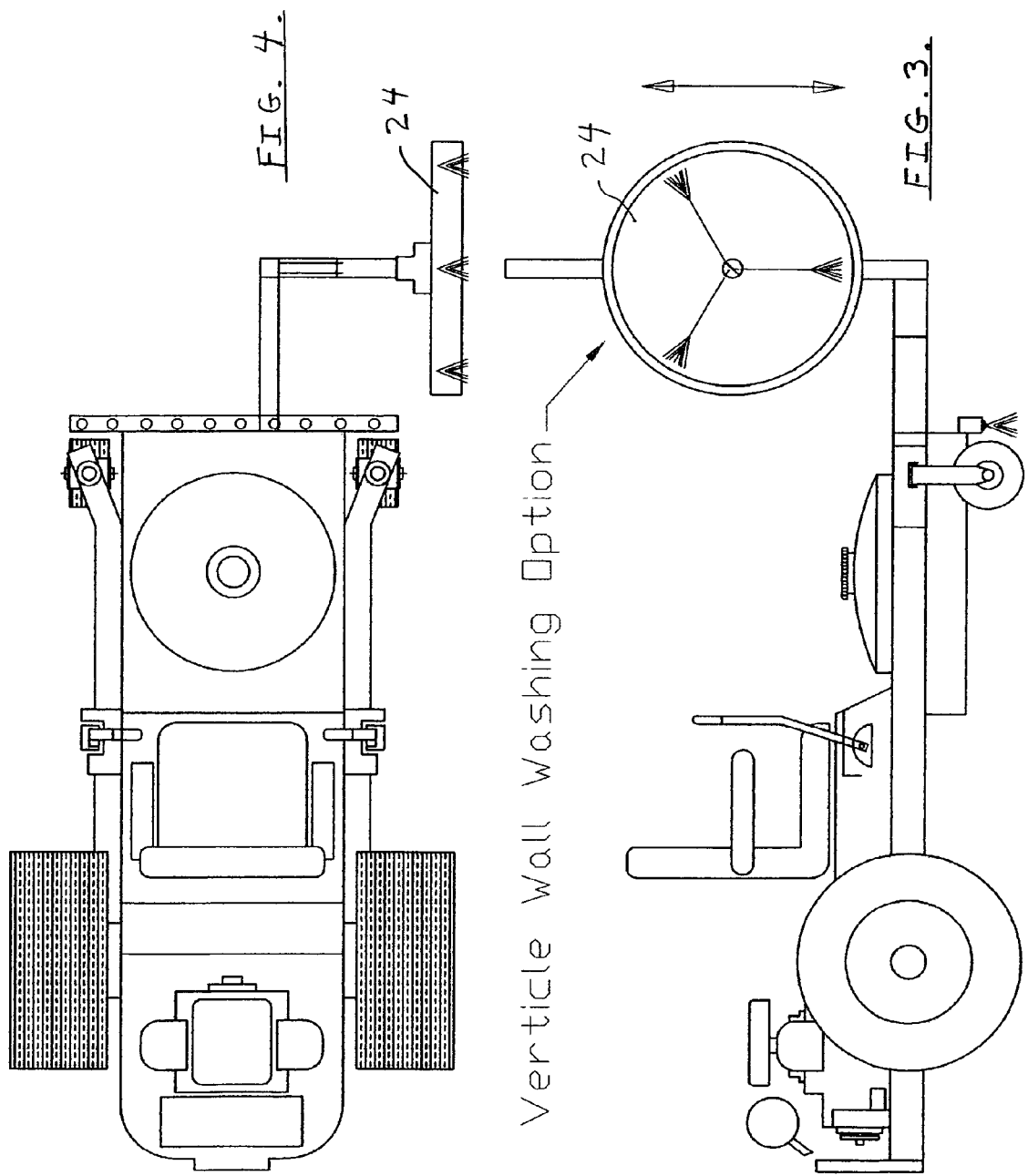

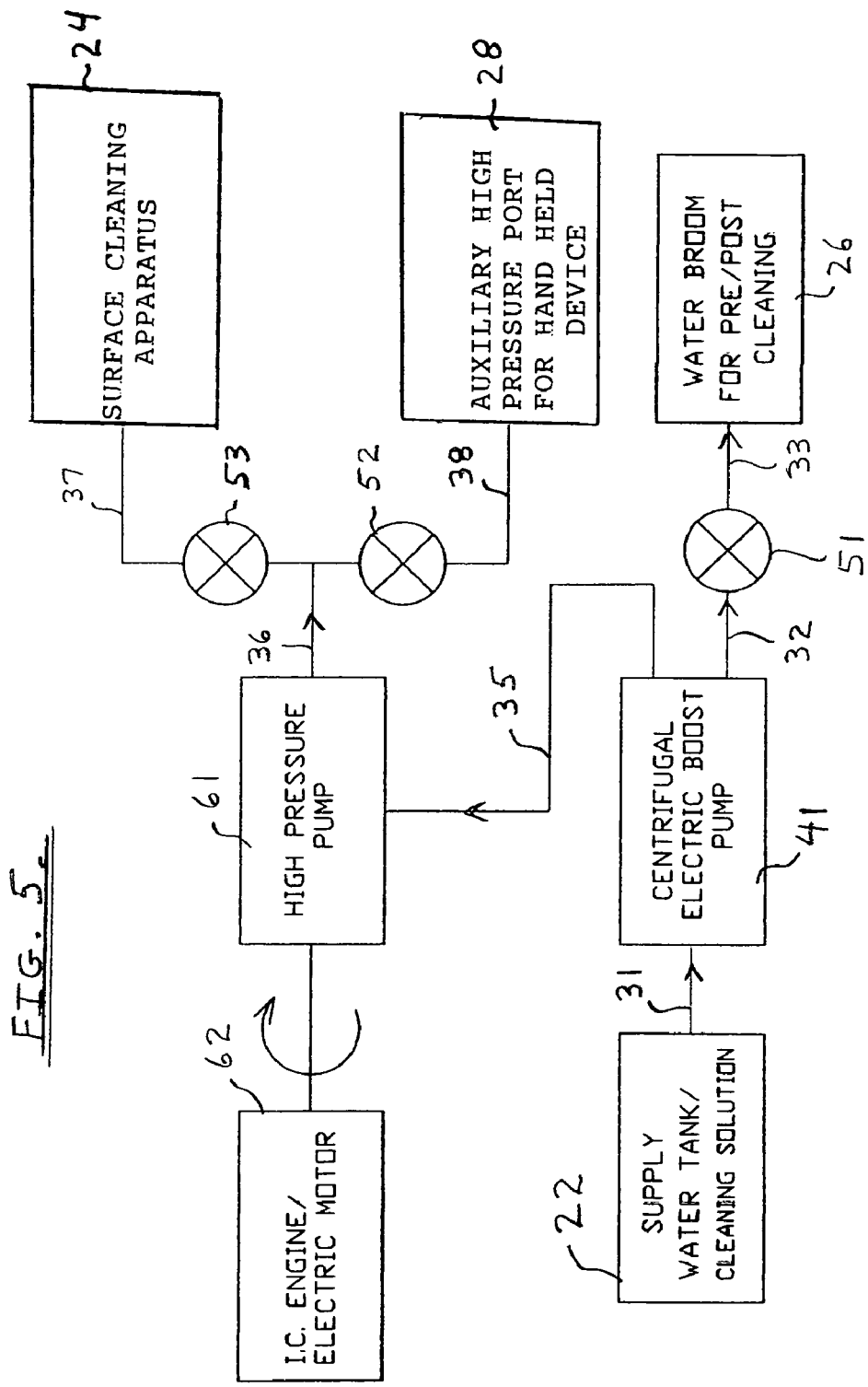

CLEANING METHOD AND SYSTEM

BACKGROUND AND OBJECTS OF THE INVENTION

The present invention is generally related to the cleaning arts and, in particular, to a novel system and method useful for cleaning driveways and other related surfaces.

Larger scale street sweepers have been utilized in the cleaning arts for many years. Such street sweepers have evolved into very complex and expensive systems. Besides the cost of upkeep and repair, the larger sweepers are often not practical for smaller surfaces such as driveways or building walls in more confined areas.

Accordingly, it is an object of the present invention to demonstrate a cleaning system and method which is specially adapted for with driveways.

It is also an object of the invention to set forth a system in which an existing ZTR type of lawn mower is modified so it may be efficiently used as a cleaning device.

It is a further object of the invention to show an adapted cleaning system which has a wide range of applications such as residential driveways, subdivision pool areas and tennis courts. Further uses include warehouse surface areas, retaining walls, loading docks, aviation taxiways and runways, tractor trailers, boat docks and ramps and playground or park equipment to list a few of the wide ranging uses.

It is a still further object of the invention to suggest a business method in which plural cleaning machines are rented to customers as part of an overall cleaning method which is able to cover a wide variety of surfaces.

It is also an object to set forth a cleaning system and method which includes different high pressure and low pressure cleaning functions which are arranged in a unique way such that various surfaces may be most efficiently cleaned. Such enhances the overall marketability of the invention and the related business method.

PRIOR ART PATENTS AND DESIGNS

During the course of preparing this specification for submission to the U.S. Patent and Trademark Office, a full search of the prior art was conducted. Such includes Class 15 and related machine design classes.

U.S. Pat. No. 4,343,060 issued to Hildebrand et al and assigned to Elgin Sweeper Company teaches the use of a series of hydraulic motors with appropriate control means to effect a large scale cleaning operation.

U.S. Pat. No. 6,959,466 teaches the use of variable speed control devices as part of a sweeping and cleaning operation.

U.S. Pat. No. 6,948,213 teaches the use of a sweeper including a collection hopper which has water being sprayed therein.

The present invention is submitted to be clearly patentable over these and all known prior art systems and methods of use.

SUMMARY OF THE INVENTION

A ZTR mower system is converted into a highly efficient and versatile ZTR cleaning system.

The invention incorporates both high and low pressure flow lines to enable a more thorough cleaning for specialized applications such as driveways, runways, walls and many other described surfaces.

The ZTR cleaning system may be sold or rented to a user in a completed form or the components may be sold in a kit or package form so that a user may readily convert his or her existing mower into a very useful cleaning system.

The business method aspects of the invention involve providing the ZTR cleaning device or the conversion kit elements to an equipment rental company. The company can then rent the cleaning system or the mower to users in the art.

The invention also applies to non-ZTR mowers.

BRIEF DESCRIPTION OF THE DRAWING FIGURES

FIGS. 1 and 2 show side and top views respectively and in schematic form of a ZTR system which has been converted into a cleaning device useful for specialized horizontal surfaces such as driveways.

FIGS. 3 and 4 show side and top views respectively of a ZTR cleaning device which is adapted for the cleaning of vertical surfaces such as walls, trailer side walls etc.

FIG. 5 shows, in schematic block diagram format, the various elements utilized in practice of the invention and their relationship to each other.

FULL DESCRIPTION OF THE PREFERRED EMBODIMENTS

Figure 6:
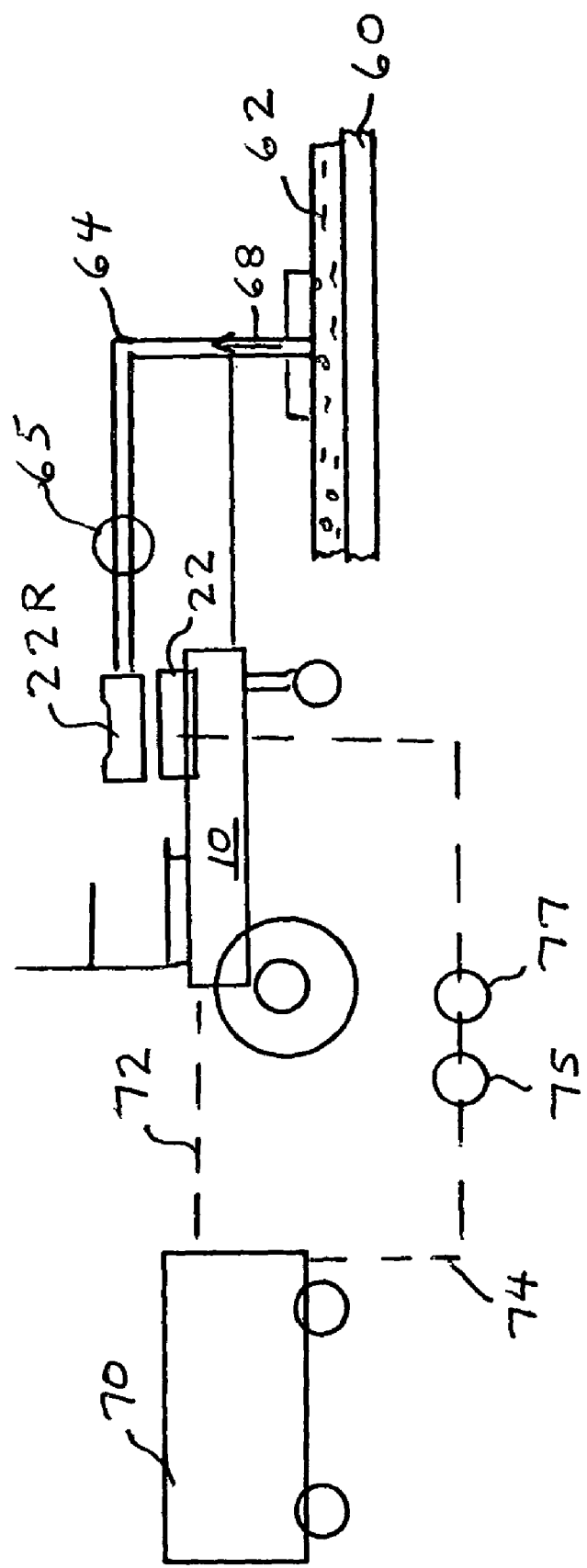
FIG. 6 is a schematic view of the water and cleaning fluid reclamation aspects of the invention method and system.

Referring to the drawing figures, FIGS. 1 and 2 show side and top views respectively of the zero turn radius, hereinafter ZTR, device 10.

For use as a cleaning system, the mower deck has been removed and a water supply tank placed as shown at numeral 22.

The cleaning device 10 has engine and drive elements 12, operator control means as indicated schematically at 14. The ZTR cleaning system 10 typically has large rear drive wheels 16 and significantly smaller front wheels indicated at 18.

Extending from the front portion of the ZTR cleaning system 20 is a water/cleaning solution supply arm 25. A surface washer 24 is shown as extending from the supply arm.

The surface washer 24 is intended to convey high pressure cleaning fluid as will be further described.

As further shown in FIG. 1, the front portion of the ZTR cleaning system includes a fluid supply arm 27 having an elongated front water broom extending therefrom as indicated at numeral 26.

As will be further shown, the water broom may be utilized for pre-cleaning and/or post-cleaning functions and may, for example, be supplied with cleaning fluid at a relatively lower pressure.

FIGS. 3 and 4 illustrate the versatility of the cleaning method of use. The surface washer 24 is shown as operating in a vertical position enabling it to clean, for example, walls, building sidewalls, tractor trailers etc. as previously described.

Referring to FIG. 5, a functional block diagram of the overall system is shown.

The water and cleaning fluid supply tank is shown at numeral 22.

A centrifugal electric boost pump is indicated at numeral 41 and will be further described with reference to the system components.

Referring further to FIG. 5, water/cleaning solution is fed, via line 31, into the centrifugal electric boost pump 41.

From there, it may be fed into a water broom 26 for pre or post-cleaning of a particular surface. Such is accomplished via 32 and 33 and also upon the position of solenoid valve 51.

Cleaning fluid from the centrifugal pump 41 is also fed, via line 35, to a high pressure pump 61 which is driven by an internal combustion engine/electric motor output shown at numeral 62.

Fluid exiting the high pressure pump 61 feeds into line 36 and from there into a surface cleaning apparatus indicated at numeral 24 or an auxiliary high pressure port 28 for a hand held spray cleaning device.

Flow into elements 24 and 28 is controlled via lines 36, 37 and 38 and depending upon the positioning of solenoid valves 52 and 53.

Such valve positioning would normally be controlled at the option of the machine operator.

From the showings in FIG. 5 and from FIGS. 1-4 generally, it will be appreciated that the overall ZTR converted cleaning device has the flexibility of using both high pressure and low pressure cleaning lines along with the maneuverability of a zero turn radius machine.

Such makes it especially useful for such specialized cleaning jobs as driveways and may other surfaces which have posed a problem in the cleaning arts.

The business method aspects of the present invention involve the following steps:

providing means and equipment for converting a ZTR mowing machine into a ZTR cleaning system, converting the mowing system into a highly efficient cleaning system, renting or selling the converted system to users in the cleaning arts.

It is noted that rental companies would find the invention to be highly valuable since ZTR mowers can readily be converted into a cleaning system thus effectively increasing their equipment inventory.

Referring to the schematic diagram of FIG. 6, further aspects of the invention are shown.

A surface 60 which has been cleaned may have water or cleaning solution 62 remaining thereon. It may often be necessary to reclaim such excess water or cleaning solution.

To accomplish such reclamation, the cleaning system may include a suction line 64 with a vacuum-creating pump 65. The suction line thus pulls the excess fluid upward as indicated by arrow 68.

The reclaimed fluid may be pumped to tank 22 or to a special reclamation tank 22R located on the modified mower 10.

Such is an important aspect of the overall invention since local, state or federal statutes may require reclamation of a cleaning solution to reduce environmental pollution. Health and safety of persons near an area to be cleaned are also of paramount importance. In addition, it may be necessary to reclaim water in serious drought conditions.

In a further aspect of the invention, for larger cleaning jobs, more water or cleaning solution may be needed than that contained in tank 22.

In such cases, a larger tank 70 may be towed behind the modified mower 10 by means of a connector element 72.

As needed, an operator can supply fluid to tank 22 by means of line 74, pump 75 and valve unit 77.

Thus, larger jobs may be performed more efficiently without the need to return to a supply site to refill the tank 22.

The larger water and/or cleaning solution volume carried by tank 70 would be critical for larger areas such as airport runways, parking lots, larger driveways and many other uses.

A more time efficient cleaning is thus achieved while still utilizing the high pressure/low pressure system and method previously described.

Figure 7:
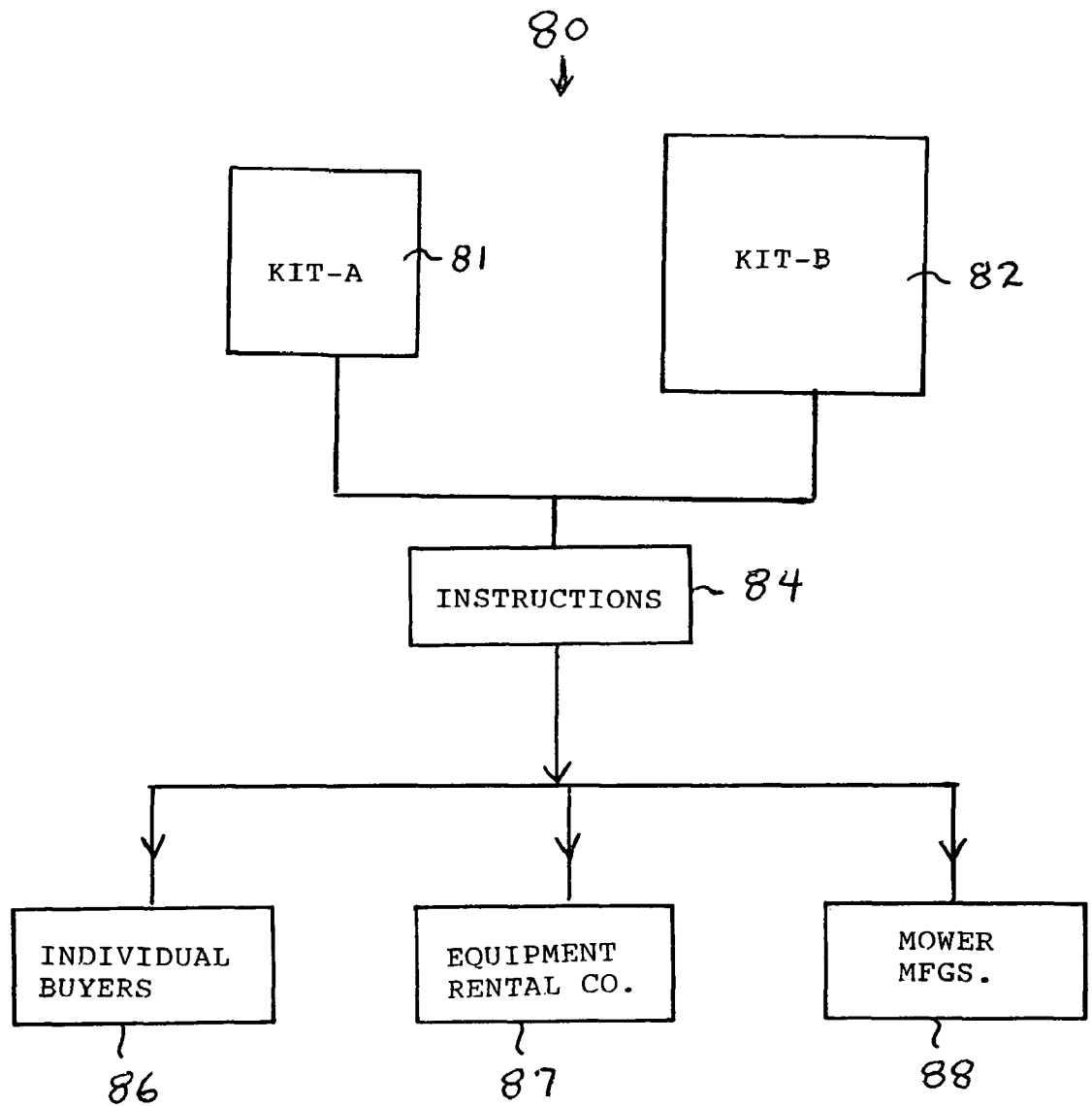
FIG. 7 shows, in block diagram form, the more significant aspects of the business method steps of the invention.

FIG. 7 illustrates, in block diagram form, some business method aspects of the invention.

As will be appreciated, the principles disclosed have utility with non-ZTR types of mowers and equipment as well as with the known ZTR types.

The method steps 80 in FIG. 7 include providing a first type of kit shown at block 81 and second type of kit shown at block 82.

For example, KIT-A may include the basic elements of the invention such as a water tank, a surface cleaning apparatus and a water broom. A second type of kit, KIT-B, may include the above basic elements and further include solenoid valves and flow line elements.

The business method would also include providing an instruction manual which teaches how to modify various types of mowers to convert them into cleaning systems. Such is indicated at block 84.

Blocks 86, 87 and 88 indicate that the business method would include sales to individual buyers, to equipment rental companies and/or to the major mower manufacturers in the art.

As will be appreciated by those of skill in the art, the method and system disclosed have universal application to many different types of lawn mowers and operating equipment, i.e. not only to equipment of the ZTR type.

It is intended in this specification to cover all equivalent valving and fluid control designs which would reasonably occur to those of skill in the fluid engineering arts.

The invention is further defined by the claims appended hereto.

We claim:

1. A method of cleaning a surface comprising the steps of:
A) providing a surface to be cleaned,
B) converting a zero-turn radius lawn mower into a surface cleaning apparatus (24),
C) adding a water supply tank (22) to a mower deck area, said water supply tank containing water and a cleaning solution,
D) providing a low pressure pump(41) at an exit of said water supply tank and a first low pressure flow line(32) at an exit of said low pressure pump,
E) providing a first solenoid valve(51) in said first low pressure flow line, wherein said first solenoid valve controls the flow of the cleaning solution to a water broom (26) which is used to pre-clean and/or post-clean a surface,
F) providing a second low pressure flow line(35) exiting said low pressure pump, said second low pressure flow line feeding into a high pressure pump(61) which supplies the cleaning solution to a first high pressure flow line (37), wherein said first high pressure flow line has a second solenoid valve(53) contained therein to control the flow of the cleaning solution to the surface cleaning apparatus(24), and wherein said surface cleaning apparatus is pivotable from a horizontal position to a vertical cleaning position,
G) providing a second high pressure flow line(38) having a third solenoid valve(52) contained therein and providing flow control of the cleaning solution to an auxiliary high pressure port(28) for a hand-held cleaning device,
H) providing a pump and flow line means (64) for reclaiming water and the cleaning solution(62) from a cleaned surface (60) and providing a reclamation tank(22R) means for receiving water and the cleaning solution,
I) providing a larger tank means(70) towable behind the surface cleaning apparatus(10), said larger tank means containing water and the cleaning solution to enable cleaning of a larger surface,
J) cleaning the surface with the water broom,
K) cleaning the surface by applying water and the cleaning solution to the surface with the surface cleaning apparatus, and
L) reclaiming water and the cleaning solution from the cleaned surface into said reclamation tank means.

\* \* \* \* \*